Patented Oct. 24, 1933

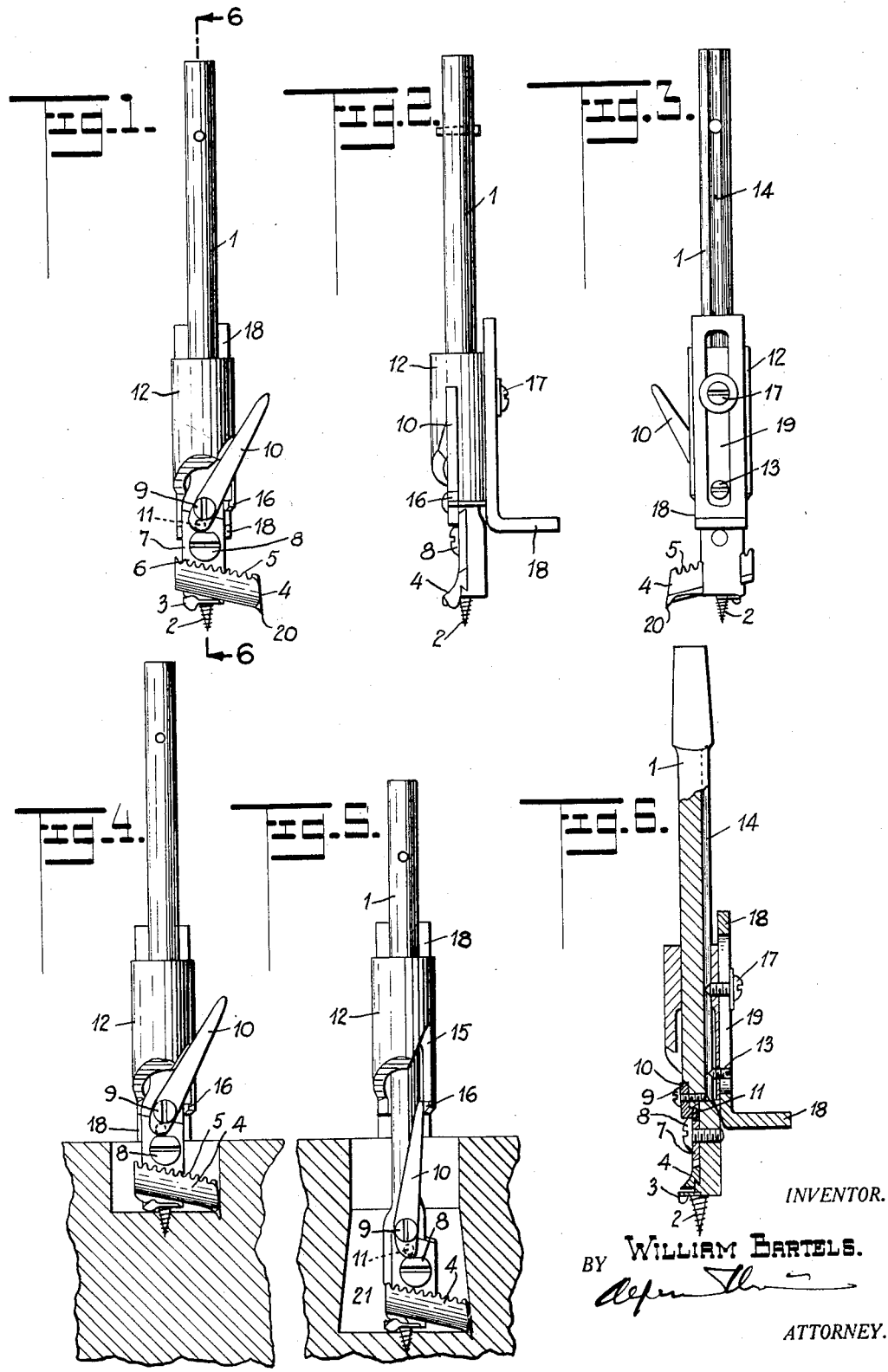

1,931,882

UNITED STATES PATENT OFFICE 1,931,882

BORING TOOL

William Bartels, New York, N. Y.

Application June 12, 1933. Serial No. 675,351

8 Claims. (Cl. 145—124)

My invention relates to boring tools and more particularly tools of the kind, whereby cylindrical holes can be bored, which gradually become conically enlarged at the bottom.

The object of my invention is to produce a tool of this character which is efficient in operation and of comparatively inexpensive manufacture, and which is strong and durable.

The boring tool according to my invention comprises a spindle which at its lower extremity is formed with a small centering drill and a small cutter. In a recess above the the latter is slidably mounted an expanding cutter provided along its upper edge with a series of fine teeth engaged by similar teeth provided along the lower edge of a slide also mounted in a recess and held in place by a screw, or the like, extending with play through a slot in said slide. With the latter cooperates a small level pivoted to the spindle and provided below its fulcrum with a hook-shaped end engaging a recess in said slide. The upward and outwardly projecting arm of said lever is so disposed as to be engaged by a catch on a guide-member slidably mounted on the spindle, but held against rotation thereon. To the said guide-member is secured for vertical adjustment a stop whereby the depth of the bore-hole may be determined.

The boring tool is so designed that it can be used either in a machine, or in a carpenter's brace, in which latter event the upper end of the spindle, instead of being made cylindrical, is of tapering square cross-section.

In order to more fully explain my invention, I refer to the annexed drawing on which I have shown, by way of illustration, a preferred embodiment of the invention, and on which Fig. 1 is a front elevation of the boring tool, Fig. 2 a side elevation, Fig. 3 a rear elevation; Figs. 4 and 5 are similar views as Fig. 1 showing the tool in operation, the movable parts being shown in different positions; Fig. 6 is a longitudinal section along line 6—6 in Fig. 1.

At 1 is shown the spindle, whose enlarged lower portion is formed with a small centering drill 2 and a small cutter 3. In a recess in the enlarged portion above the small cutter 3 is slidably mounted an expanding cutter 4 having along its upper edge a series of fine teeth 5. In engagement therewith are corresponding teeth 6 provided on the upper edge of a slide 7, likewise mounted in a recess in the enlarged lower portion of the spindle. At 8 is shown a screw for holding said slide in place, the said screw extending with play through a slot in the slide, so as to permit its sliding movement. Above said slide is pivoted to the spindle at 9 a lever 10 whose lower hook-shaped end, shown at 11 in Fig. 6, engages in a recess in the slide. The longer arm of the lever normally projects upwards and outwards, as shown in Figs. 1, 3 and 4.

On spindle 1 is mounted for sliding movement thereon a cylindrical guide-member 12 which is held against rotation relative to the spindle by a small screw 13 entering a longitudinal groove 14 cut in the spindle. The cylindrical guide-member has a cut-out portion in the shape of an inverted V, as clearly shown at 15 in Fig. 5 to receive the upper arm of lever 10. At its lower edge, the guide-member is provided with a small catch 16 disposed to engage the lower side of the upper arm of lever 10.

To the flattened rear side of the cylindrical guide-member is detachably secured by a screw 17 a stop 18 which, as shown in Figs. 3 and 6, is made with a long slot 19 allowing the stop to be adjusted to different positions, depending on the depth of the bore-hole.

As shown in Fig. 6, the spindle 1, if the boring tool shall be used on a carpenter's brace, is made at its upper end with a taper of square cross-section.

The drawing also shows that the expanding cutter is set at a slight angle being downwardly inclined toward the walls of the bore-hole, where the cutter is provided with a cutting tooth shown at 20 in the drawing.

The operation of the tool will readily appear from the foregoing description:—

As shown in Fig. 4, the centering drill 2 holds the tool in the proper position while the hole is being bored. Fig. 4 shows the hole of cylindrical shape. As the depth of the hole now progresses, the catch 16 at the lower end of the guide-member, while the latter and the spindle move relative to each other, gradually pushes the lever 10 from its outwardly projecting position as shown in Figs. 1, 3 and 4 to an inward position as shown in Fig. 5. As the upper lever arm is being pushed into the inward position, its hook-shaped lower end 11 engaging the slide 7 moves the same from the position shown in Fig. 4 to the position shown in Fig. 5. Because of the meshing teeth along the lower edge of the slide and the upper edge of the expanding cutter 4, the latter is gradually being moved outwards from the position shown in Fig. 4 to the position shown in Fig. 5 with the result that while the boring tool is being operated, the hole is gradually conically enlarged as clearly shown at 21 in Fig. 5.

The stop 18 fastened to the rear side of the guide-member 12 can be set for any desired depth of the hole to be bored, and is secured in its adjusted position by the screw 17.

When the lever 10 is removed and the slide 7 is tightened, the boring tool can be used for boring cylindrical holes.

It will be obvious that the relative position of the slide and the cutter can be varied, so that holes of varying conical widths can be bored.

Obviously, various changes can be made in the boring tool without a departure from the gist of the invention, and therefore, my invention is, of course, not limited to the construction above described and shown on the drawing.

I claim:

1. A boring tool of the character described, comprising a spindle, a cutter provided at the lower end of said spindle being slidably mounted in a guiding recess therein, a slide in engagement with said cutter for displacing the same laterally relative to said spindle, a member pivoted to said spindle and adapted to operate said slide, and a guiding element on said spindle movable relative thereto and being operatively associated with said member to thereby move said slide.

2. A boring tool of the character described, comprising a spindle, a cutter provided at the lower end of said spindle being slidably mounted in a guiding recess therein, a slide in engagement with said cutter for displacing the same laterally relative to said spindle, a member pivoted to said spindle and adapted to operate said slide, and a guiding element on said spindle movable relative thereto and being operatively associated with said member to thereby move said slide, and means for holding said guiding element against rotation on said spindle.

3. A boring tool of the character described, comprising a spindle, a cutter provided at the lower end of said spindle being slidably mounted in a guiding recess therein, a slide in engagement with said cutter for displacing the same laterally relative to said spindle, a member pivoted to said spindle and adapted to operate said slide, a guiding element on said spindle movable relative thereto and being operatively associated with said member to thereby move said slide, and an adjustable stop detachably secured to said guiding element for determining the depth of the bore-hole.

4. A boring tool of the character described, comprising a spindle, a cutter provided at its lower end being slidably mounted in a guiding recess in an enlarged portion of said spindle and being formed along its upper edge with a series of teeth, a slide adjacent said cutter and having teeth engaging the teeth on said cutter for laterally displacing the same, a lever pivoted on said spindle engaging said slide for operating the same, said lever projecting upwardly and outwardly relative to said spindle, and a guiding element on said spindle movable relative thereto for operating said lever for moving said slide.

5. A boring tool as specified in claim 4, including a screw for holding said slide in place on said spindle, said screw extending with play through a slot in said side.

6. A boring tool as specified in claim 4, in which said guiding element is formed with a cut-out portion to receive and guide the upwardly projecting lever arm, a catch being provided on said guiding element operatively engaging said lever arm.

7. A boring tool as specified in claim 4, including a stop provided on said guiding element, and means for adjusting, and securing said stop in position.

8. A boring tool as specified in claim 1, including means, whereby the relative position of the slide and the cutter can be varied.

WILLIAM BARTELS.